United States Patent
Kant et al.

(10) Patent No.: US 6,417,993 B1
(45) Date of Patent: *Jul. 9, 2002

(54) HEAD SUSPENSION MOUNTING SYSTEM FOR A DISC DRIVE

(75) Inventors: Rishi Kant, Boulder; Steve R. Speckmann, Louisville; Mark A. Schwandt, Platteville, all of CO (US)

(73) Assignee: Seagate Technology LLC, Scotts Valley, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/179,530

(22) Filed: Oct. 27, 1998

Related U.S. Application Data

(60) Provisional application No. 60/063,626, filed on Oct. 27, 1997.

(51) Int. Cl.[7] ............................................. G11B 21/16
(52) U.S. Cl. .................................................... 360/244.6
(58) Field of Search ................................ 360/103–105, 360/244, 244.1–244.9

(56) References Cited

U.S. PATENT DOCUMENTS

| | | | | |
|---|---|---|---|---|
| 5,497,282 A | * | 3/1996 | Hoffmann et al. | 360/104 |
| 5,796,555 A | * | 8/1998 | Aoyagi et al. | 360/104 |
| 5,860,206 A | * | 1/1999 | Tochiyama | 360/104 |
| 5,963,383 A | * | 10/1999 | Jurgenson | 360/104 |

FOREIGN PATENT DOCUMENTS

| | | | | |
|---|---|---|---|---|
| JP | 2-294977 | * | 12/1990 | 360/104 |
| JP | 4-254973 | * | 9/1992 | 360/104 |
| JP | 4-319581 | * | 11/1992 | 360/104 |
| JP | 4-360081 | * | 12/1992 | 360/104 |

OTHER PUBLICATIONS

US 5,140,481, 08/1992, Cain et al. (withdrawn)*

* cited by examiner

Primary Examiner—Allen Cao
(74) Attorney, Agent, or Firm—Derek J. Berger; Shawn B. Dempster

(57) ABSTRACT

An improved system for mounting the head suspensions to the actuator mounting arms of a disc drive actuator. The mounting system of the invention includes novel features on both the head suspension mounting plates and on the actuator head mounting arms that facilitate head suspension mounting without the introduction of plastic deformation in any of the mounting elements. The mounting plate of the invention includes a boss and a hole. The boss and hole are dimensioned for interference fit with complementary elements on a second mounting plate located on the opposite side of the actuator head mounting arm, to provide the retention force of the mounting system. The bosses of the mounting plates also form an interference fit with cooperative holes in the actuator head mounting arm. Compliance features are included with the holes on the actuator head mounting arm to prevent plastic deformation of the material of the head mounting arm.

15 Claims, 6 Drawing Sheets

HEAD SUSPENSION MOUNTING SYSTEM FOR A DISC DRIVE

CROSS REFERENCE TO RELATED APPLICATION

This application claims the benefit of U.S. Provisional Application Ser. No. 60/063,626, filed Oct. 27, 1997.

FIELD OF THE INVENTION

This invention relates generally to the field of hard disc drive data storage devices, and more particularly, but not by way of limitation, to an improved mounting system for attaching the head suspensions that support the read/write heads to the head mounting arms of the disc drive actuator.

BACKGROUND OF THE INVENTION

Disc drives of the type known as "Winchester" disc drives or hard disc drives are well known in the industry. Such disc drives record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 10,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. An actuator housing is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator housing opposite to the coil, the actuator housing also typically includes a plurality of vertically aligned, radially extending actuator head mounting arms, to which the head suspensions mentioned above are mounted. When controlled DC current is applied to the coil, a magnetic field is formed surrounding the coil which interacts with the magnetic field of the permanent magnets to rotate the actuator housing, with the attached head suspensions and head assemblies, in accordance with the well-known Lorentz relationship. As the actuator housing rotates, the heads are moved radially across the data tracks along an accurate path.

The head suspensions mentioned above are typically formed from thin stainless steel foil. In order to provide a robust connection between the head suspension and the actuator head mounting arms, the attachment end of the head suspension is typically welded to a relatively thick mounting plate which includes features intended to cooperate with mating features on the actuator head mounting arms to attach the head suspensions to the actuator.

By far the most common head suspension mounting method in current use is swage mounting. Swage mounted head suspensions include mounting plates that are formed with a cylindrical swage boss. Typically, the entire array of head/suspension assemblies is placed in cooperative arrangement with the actuator head mounting arms, with the swage bosses of the head suspension mounting plates inserted into openings in the actuator head mounting arms. A swaging tool, consisting of a ball feature having a diameter slightly larger than the inner diameter of the swage bosses, is then passed through the entire vertically aligned stack of swage bosses, plastically deforming the swage bosses and expanding the swage bosses into firm contact with the inner diameters of the openings in the actuator head mounting arms. Thus, swage mounting of the head/suspension assemblies is simple and economical for use in high volume manufacturing environments.

Swage mounting of head suspensions does, however, produce potential problems. Firstly, the plastic deformation of the swage bosses during the swaging process induces large mechanical stresses in the material of the mounting plates, and these mechanical stresses can lead to deformation of the planar portion of the mounting plates to which the thin head suspensions are welded. Such deformation can lead to changes in the gram load applied by the head suspension to the flying head assembly. As is well known to those of skill in the art, one of the principal functions of the head suspension is to provide a load force, typically referred to in the industry as gram load, to counteract the hydrodynamic lifting force of the slider assembly of the head. In order to accurately maintain the 2.0 to 1.5 microinch (0.000002 to 0.0000015 inch) flying heights of the heads specified in disc drives of the current generation, it is essential to balance the gram load with the lifting force of the head to a very precise degree. The gram load of the head/head suspension assembly is typically set after the mounting plates are welded to the head suspension, but before the complete mounting plate/head suspension/head assembly is mounted within the disc drive.

It has been noted in the industry that swage mounting of the head suspensions alters the preset gram load of the suspension. That is, if a desired pre-swaging gram load is established at the sub-assembly level, the act of swaging results in a detrimental difference in the post-swaging gram load, and, most significantly, to differing changes to "up" and "down" head/head suspension assemblies. This difference in alteration of the gram load for "up" and "down" assemblies is referred to in the industry as "up/down bias", and affects not only the flying height of the head assemblies, but, of greater significance, the resonant frequencies of the head/head suspension assemblies.

Finally, swage mounting, by definition, plastically deforms the associated components when it is performed. If, after assembly, a faulty component is discovered, it is difficult to disassembly a swage mounted head suspension assembly without damaging other "good" components. Additionally, reinsertion of a replacement swage mounted head suspension into a head mounting arm that has already been stressed by a previous swaging operation may result in less than optimal mounting force, leading to undesirable variation in the finished product.

An additional potential drawback to typical prior art suspension mounting systems lies in the previously mentioned welding of the head suspensions to the robust mounting plates. This welding is typically accomplished by use of a high intensity laser, and can result in localized stress in the thin foil of the head suspension, again potentially leading to undesirable variation in the static pitch and roll characteristics of the entire head suspension.

For these and other reasons to be noted below, a need clearly exists for an alternative to swage mounting of the head suspension assemblies in a disc drive.

SUMMARY OF THE INVENTION

The present invention is an improved system for mounting the head suspensions to the actuator mounting arms of a disc drive actuator. The mounting system of the invention includes novel features on both the head suspension mounting plates and on the actuator head mounting arms that facilitate head suspension mounting without the introduction of plastic deformation in any of the mounting elements. The mounting plate of the invention includes a boss and a hole. The boss and hole are dimensioned for interference fit with complementary elements on a second mounting plate located on the opposite side of the actuator head mounting arm, to provide the retention force of the mounting system. The bosses of the mounting plates also form an interference fit with cooperative holes in the actuator head mounting arm. Compliance features are included with the holes on the actuator head mounting arm to prevent plastic deformation of the material of the head mounting arm.

It is an object of the invention to provide a mounting system for attaching head suspensions to actuator head mounting arms in a disc drive.

It is another object of the invention to provide a mounting system for attaching head suspensions to actuator head mounting arms in a disc drive that is self-aligning.

It is another object of the invention to provide a mounting system for attaching head suspensions to actuator head mounting arms in a disc drive that does not cause plastic deformation of the system elements, and which thus allows for simple removal and replacement of detected faulty components without altering the retention characteristics of the head suspension mounting system.

It is another object of the invention to provide a mounting system for attaching head suspensions to actuator head mounting arms in a disc drive that does not cause plastic deformation of the system elements, and which thus eliminates up/down bias in the gram load of the head suspension brought about by the mounting process.

It is another object of the invention to provide a head suspension mounting system for a disc drive that is simple and economical to implement in a high volume manufacturing environment.

The manner in which the present invention achieves these objects, as well as other features, benefits and advantages of the invention, can be best understood by a review of the following Detailed Description of the Invention, when read in conjunction with an examination of the accompanying drawings.

DETAILED DESCRIPTION OF THE INVENTION

Figure 1:
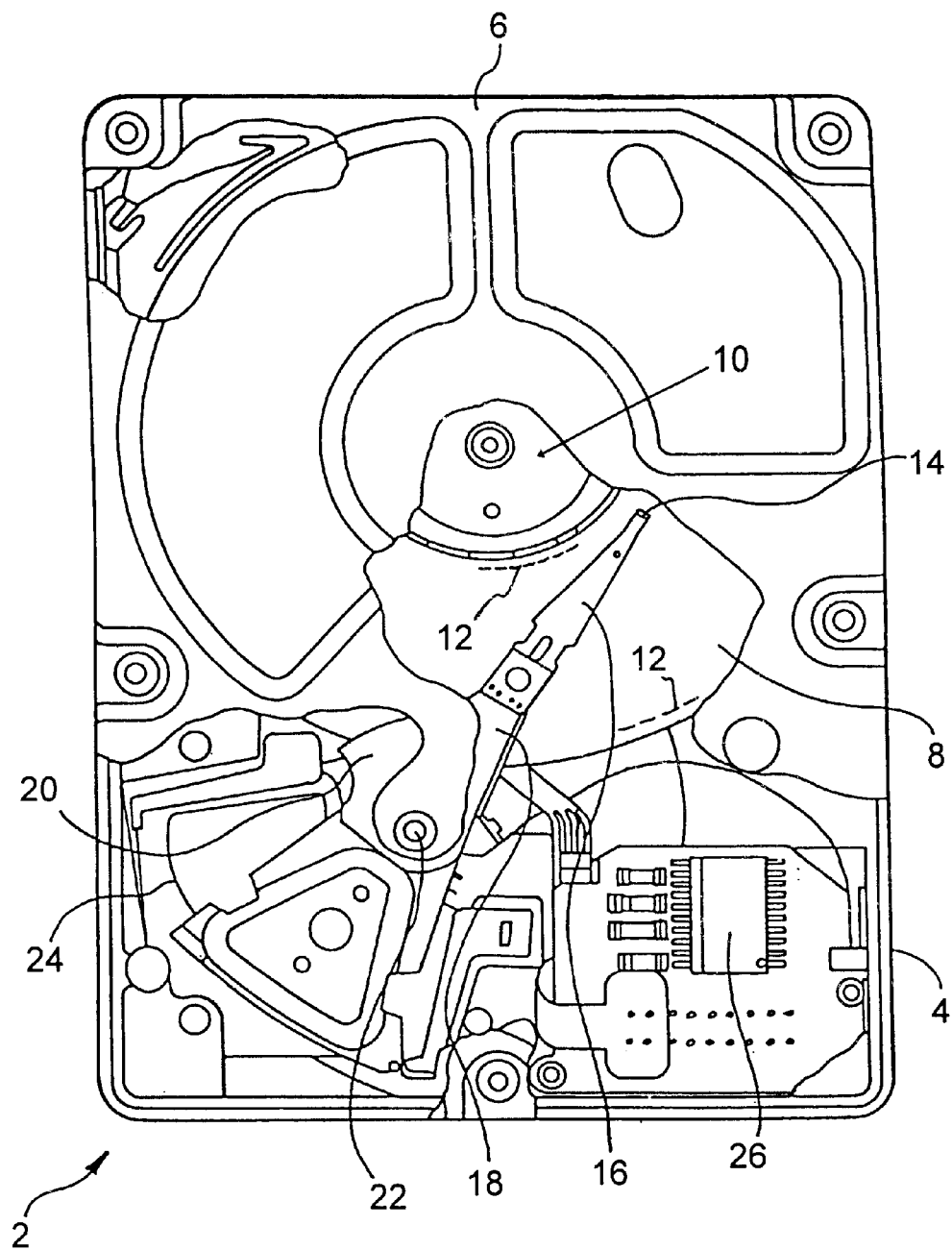
FIG. 1 is a plan view, in partial cutaway, of a prior art disc drive in which the present invention is particularly useful.

Turning now to the drawings and specifically to FIG. 1, shown is a plan view of a prior art disc drive 2 in which the present invention is particularly useful. The disc drive 2 includes a base member 4 to which all other components are directly or indirectly mounted and a top cover 6 (shown in partial cutaway) which, together with the base member 4, forms a disc drive housing which encloses delicate internal components and isolates these components from external contaminants.

The disc drive includes one or-more discs 8 which are mounted for rotation on a spindle motor shown generally at 10. The discs 8 include on their surfaces a plurality of circular, concentric data tracks, the innermost and outermost of which are shown by dashed lines at 12, on which data are recorded via an array of vertically aligned head assemblies (one of which is shown at 14). The head assemblies 14 are supported by head suspensions, or flexures 16, which are attached to actuator head mounting arms 18. The actuator head mounting arms 18 are integral to an actuator bearing housing 20 which is mounted via an array of ball bearing assemblies (not designated) for rotation about a pivot shaft 22.

Power to drive the actuator bearing housing 20 in its rotation about the pivot shaft 22 is provided by a voice coil motor (VCM) shown generally at 24. The VCM 24 consists of a coil (not separately designated) which is supported by the actuator bearing housing 20 within the magnetic field of an array of permanent magnets (also not separately designated) which are fixedly mounted to the base member 4, all in a manner well known in the industry. Electronic circuitry (partially shown at 26, generally, and partially carried on a printed circuit board (not shown)) to control all aspects of the operation of the disc drive 2 is provided, with control signals to drive the VCM 24, as well as data signals to and from the heads 14, carried between the electronic circuitry and the moving actuator assembly via a flexible printed circuit cable (PCC) 28.

Figure 2:
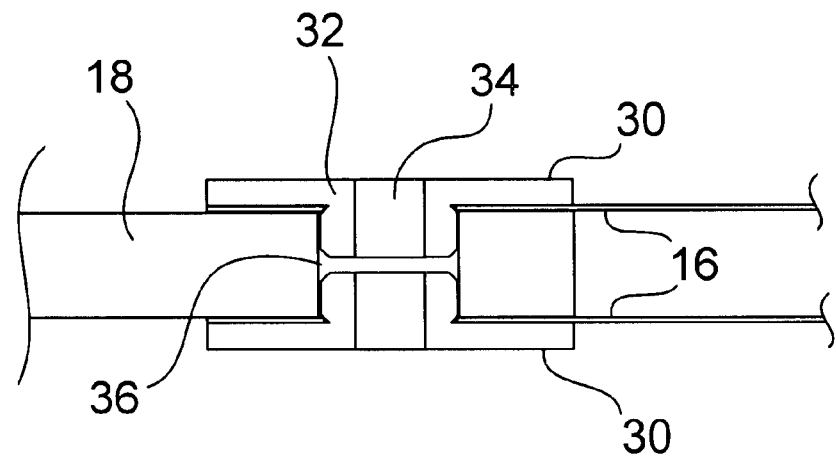
FIG. 2 is a simplified sectional elevation view of a first prior art system for mounting head suspensions to actuator head mounting arms.
Figure 3:
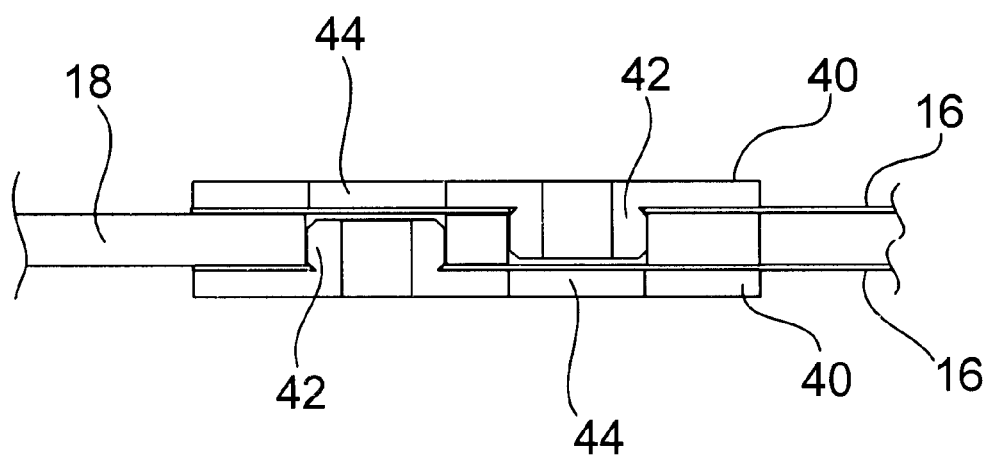
FIG. 3 is a simplified sectional elevation view of a second prior art system for mounting head suspensions to actuator head mounting arms.

Turning now to FIGS. 2 and 3, shown are simplified diagrammatic sectional elevation views of prior art swage mounting systems for attaching head/flexure assemblies (14/16 in FIG. 1) to actuator head mounting arms (18 in FIG. 1). In particular, FIG. 2 shows what is typically referred to in the industry as "back-to-back" swaging. In this swage mounting system, mounting plates 30, each including a swaging boss 32, are welded to head suspensions 16 which support heads (not shown) at their distal ends. The mounting plates 30 are typically fabricated from stainless steel. The swaging bosses 32 are inserted in a single hole 36 in the actuator head mounting arm 18. Assembly is accomplished by passing a swaging tool (not shown) through the central opening 34 in the swaging bosses 32. This swaging tool has an outer diameter slightly larger than the inner diameter of the central opening 34 in the swaging boss 32, causing the outer surface of the swaging bosses 32 to be expanded into contact with the inner surface of the hole 36 in the actuator head mounting arm 18. By closely controlling the dimensions of the hole 36 in the actuator head mounting arm 18, the central opening 34 in the swage bosses 32 and the diameter of the swaging tool, the desired amount of attachment force can be selected. Furthermore, several identical vertically aligned sets of paired head/head suspension assemblies can be attached with a single pass of the swaging tool. It is apparent from FIG. 2, however, that the only way to remove a defective head/head suspension assembly mounted in this manner is to insert a knife-like tool between the actuator head mounting arm 18 and the mounting plate 30 and pry off the defective assembly. This results in a high probability of causing damage to the actuator head mounting arm 18, with attendant high scrap costs.

It will also be apparent to one of skill in the art, upon examination of FIG. 2, that the swage mounting system of FIG. 2 also results in differing stresses applied to the mounting plates 30 on the upper and lower surfaces of the actuator head mounting arm 18, since a swaging tool passed through the central openings 34 of the swage bosses 32 will pass through the swage bosses 32 in opposite directions. One of the results of this difference is up/down bias of the gram load of the head suspension. The present invention serves to overcome this disadvantage The head/flexure mounting system of FIG. 3 is the system described in U.S. Pat. No. 5,140,481; issued Aug. 18, 1992 and U.S. Pat. No. 5,262,911, issued Aug. 16, 1993, both assigned to the assignee of the present invention and both incorporated herein by reference. From the figure it can be seen that a pair of mounting plates 40 each includes a swage boss 42 located near one end and an opening 44 near the opposite end. One of the mounting plates 40 (the upper mounting plate in FIG. 3) is welded to a head suspension 16 with the swage boss 42 nearest the distal end of the actuator head mounting arm 18 and the opening 44 closer to the base of the actuator head mounting arm 18. The orientation of the mounting plate relative to the head suspension 16 is reversed for the other mounting plate 40. FIG. 3 shows that the lower mounting plate 40 is welded to the head suspension 16 with its opening 44 closest to the distal end of the actuator head mounting arm 18 and its swage boss 42 closer to the base of the actuator head mounting arm 18. This arrangement results in the swage boss 42 of one mounting plate 40 being aligned with the opening 44 in the other mounting plate 40 when the mounting plate/flexure/head assemblies are place on opposite sides of the actuator head mounting arm 18. This system of head/head suspension mounting also reduces the vertical height requirements in the disc drive, since the swage bosses 42 are horizontally aligned and occupy the same vertical space. The disadvantages of the system of FIG. 3 include the fact that the mounting plates 40 must be substantially twice as long as the mounting plates 30 of FIG. 2, adding undesirable mass and inertia to the actuator assembly. Furthermore, the swaging tool must preferably be passed through the swaging bosses in opposite directions for up and down head/flexure assemblies, complicating the assembly process. Additionally, the use of this in-line swage mounting system results in differing "up" and "down" head/flexure assemblies, with attendant complications in assembly tooling and inventory tracking.

The swaging systems of FIGS. 2 and 3 also results in plastic deformation of the swaging bosses 42 to achieve mounting of the head suspensions 16 to the actuator head mounting arm 18, resulting, as previously mentioned, in residual stresses in the mounting plates 40 and difficulty in removal of defective assemblies without causing damage to the actuator head mounting arm 18.

The head suspension systems of FIGS. 2 and 3 also share another drawback which is common to all swage mounting techniques. Since swage mounting depends on plastic deformation of the swage bosses into intimate contact with the inner surface of the holes in the actuator head mounting arms, swage mounting causes stress to be exerted on the material of the actuator head mounting arms as well as the swage bosses. It is common practice in the industry to form the actuator body and actuator head mounting arms from a common piece of material, and, in order to minimize the moving mass, for this material to be aluminum or magnesium.

Since, as previously mentioned, the mounting plates are typically formed of stainless steel, the amount of force necessary to plastically deform the swage bosses into the desired contact with the holes in the actuator head mounting arms will also typically result in plastic deformation of the material of the actuator head mounting arms local to the mounting holes. Such deformation of the holes in the actuator head mounting arms makes it problematic to reswage a replacement to the same holes after removal of a defective head/suspension-assembly and still achieve the desired amount of mounting force.

Additionally, as previously noted, the stresses induced in the mounting plates by the swaging process can lead to up/down bias in the gram load applied by the head suspension to the flying heads, leading to uncontrolled variation in the resonant frequency of the head/head suspension assemblies and, to a lesser extent, the flying height of the heads.

Furthermore, in order to minimize the amount of plastic deformation of the holes in the actuator head mounting arms, it is necessary to form the actuator head mounting arms with a defined minimum vertical thickness, which may also be a limiting factor in inter-disc spacing and the total data capacity of the disc drive.

The present invention overcomes all of these drawbacks, as will be explained in detail below, since the present invention does not involve plastic deformation of either the mounting plates or the actuator head mounting arms.

Figure 4:
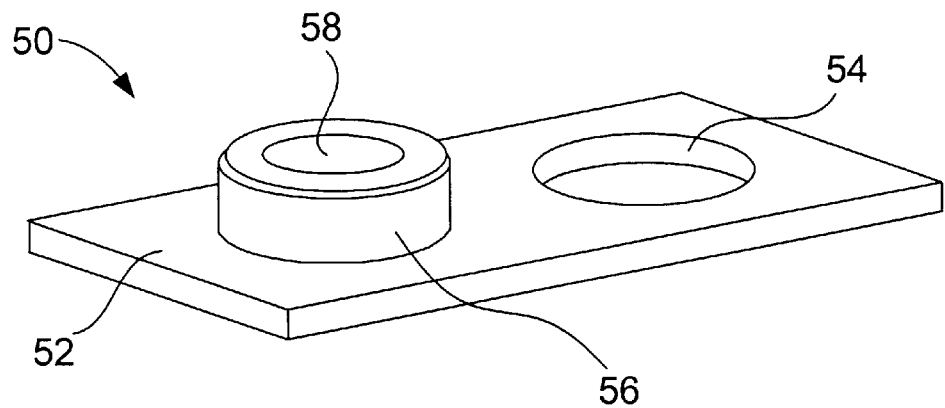
FIG. 4 is a perspective view of a mounting plate which forms a portion of the head suspension mounting system of the present invention.

Turning now to FIG. 4, shown is a perspective view of a novel mounting plate 50 which forms a portion of the head suspension mounting system of the present invention. The mounting plate 50 comprises a planar base portion 52 that is substantially rectangular in form. Near one end of the base portion 52 is a through hole 54, and at the opposite end is a projecting boss 56. The height of the boss 56 is selected to pass through the thickness of a cooperative actuator head mounting arm and into the hole 54 in a second mounting plate 50 on the opposite side of the actuator head mounting arm. The diameter of the hole 54 and the outer diameter of the boss 56 are selected such that a pair of mounting plates 50, situated with the boss 56 of one mounting plate 50 aligned with the hole 54 of the other mounting plate 50 and vice versa, will interface with one another with interference fits. That is, the boss 56 of one mounting plate 50 will form an interference fit with the hole 54 of a second mounting plate 50, while the boss 54 of the second mounting plate forms an interference fit with the hole 54 of the first mounting plate 50.

FIG. 4 also shows that the boss 56 includes a central bore 58.

Figure 5:
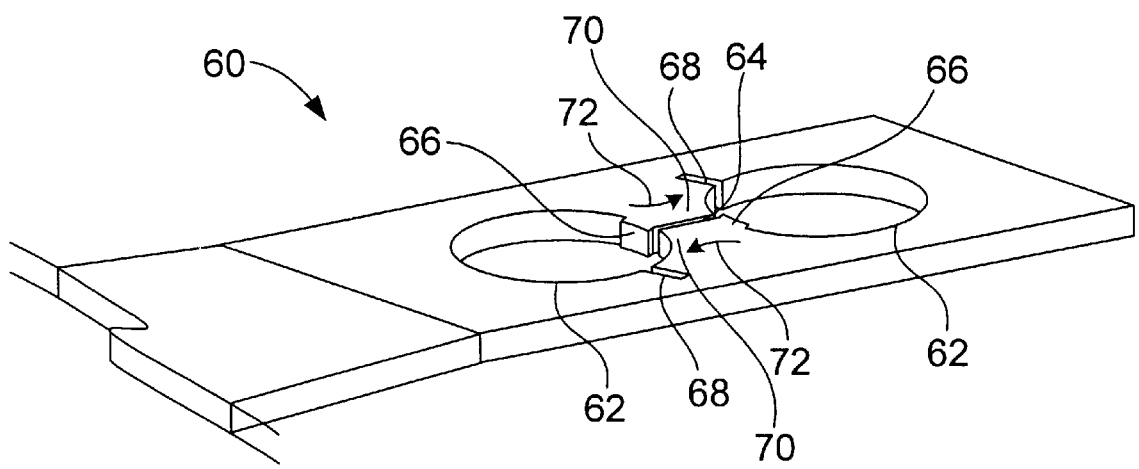
FIG. 5 is a perspective view of a first embodiment of an actuator head mounting arm made in accordance with the present invention.

FIG. 5 is a perspective view of the distal portion of an actuator head mounting arm 60 which has been modified in accordance with the present invention. In the figure, the actuator head mounting arm 60 can be seen to include a pair of longitudinally spaced holes 62, dimensioned and spaced to interact with the bosses (56 in FIG. 4) of a pair of mounting plates (50 in FIG. 4) in a manner to be discussed in detail hereinbelow. The holes 62 are connected by a connecting slot 64.

The holes 62 in the actuator head mounting arm 60 can also be seen to include contact surfaces 66, composed of portions of the inner diameters of the holes 62 having smaller diameters than the remainder of the holes 62. The dimension of the holes 62 between the contact surfaces 66 and the opposite sides of the holes 62 is selected to again form an interference fit between the holes 62 and bosses of mounting plates, such as the mounting plate 50 of FIG. 4.

Also associated with each of the holes 62 is a radially extending slot 68, or cut. The combination of these slots 68 and the connecting slot 64 forms two tabs 70. When the boss of a mounting plate is inserted through a hole 62 in the actuator head mounting arm 60, contact between the boss and the contact surface 66 will cause the tabs 70 to be bent, generally in the direction of arrows 72. This bending of the tabs 70 thus serves to reduce the inner diameter of the opposite hole 62, increasing the contact against the mounting plate boss inserted in the opposite hole 62. The bending of the tabs 70 also acts to close the slots 68, which is the type of deformation which induces the least amount of localized material stress.

The dimensions and locations of the various features of the actuator head mounting arm 60, and the dimensions of the cooperating mounting plate bosses, are selected such that the bending of the tabs 70 does not result in plastic deformation of the material of the actuator head mounting arm 60. Thus, if it becomes necessary to remove and replace a faulty head/head suspension assembly, the mounting system will suffer no reduction in effectiveness.

The manner in which the mounting plate 50 of FIG. 4 and the actuator head mounting arm 60 of FIG. 5 act together to mount head suspensions will be described below in the descriptions of FIGS. 6 through 9.

Figure 6:
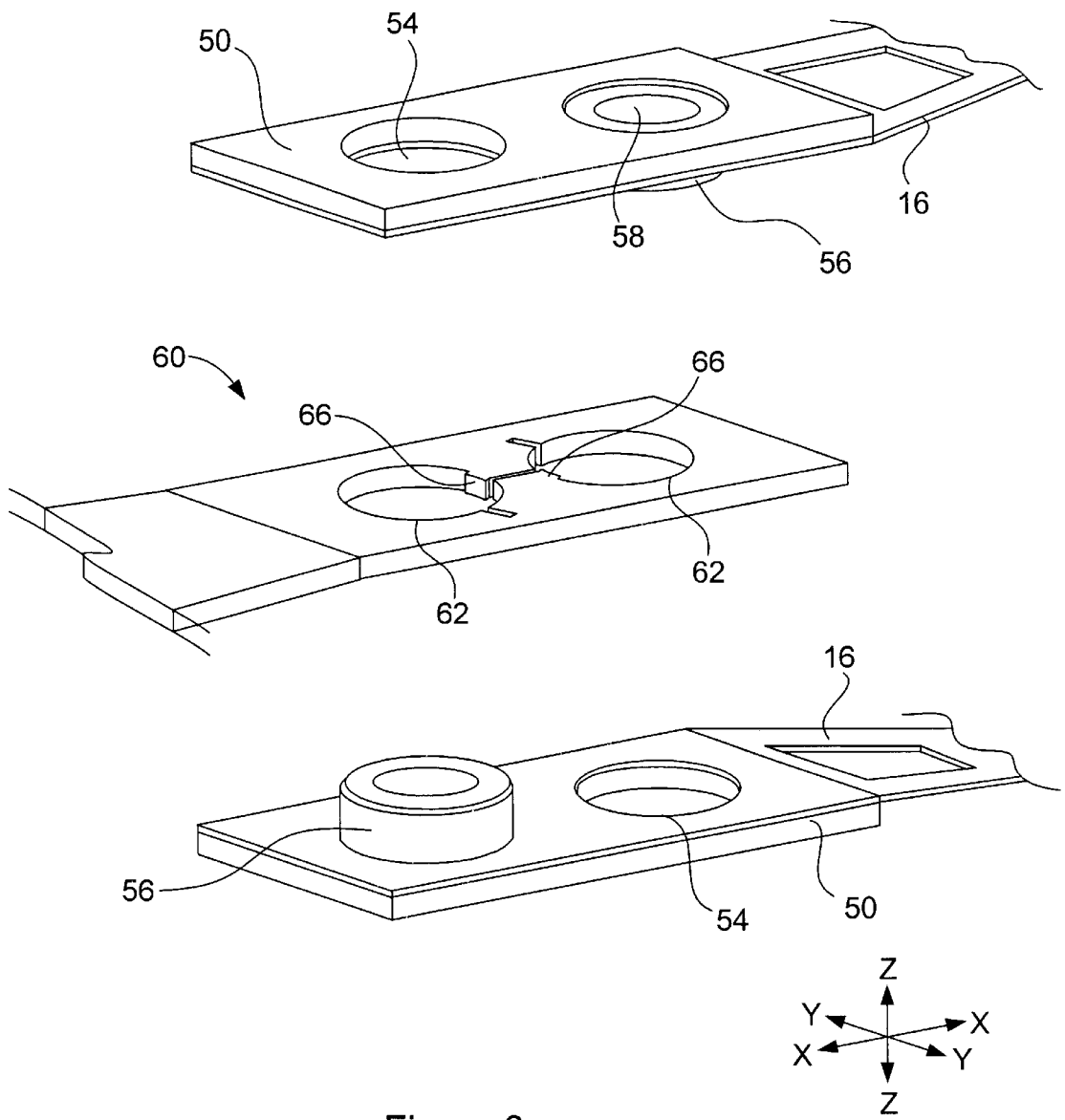
FIG. 6 is an exploded perspective view of components forming a first embodiment of the head suspension mounting system of the present invention.

FIG. 6 is an exploded perspective view of elements of a first embodiment of a head suspension mounting system made in accordance with the present invention. FIG. 6 shows a pair of mounting plates 50 with a head suspension 16 (shown in partial view) welded to each. A single actuator head mounting arm 60 is also shown. One of skill in the art will appreciate that this combination of elements can be replicated for additional numbers of heads and discs, and the scope of the present invention is, therefore, not envisioned as being limited by the actual number of heads and discs included in the disc drive.

In FIG. 6, the mounting plate 50 to be mounted on the upper surface of the actuator head mounting arm 60 is welded to the head suspension 16 with its boss 56 closest to the operational portion of the head suspension 16, while the hole 54 in the upper mounting plate 50 is located at the opposite end of the mounting plate 50. By contrast, the lower mounting plate is welded to the head suspension such that it boss 56 is located away from the operational end of the head suspension 16, and the hole 54 is closest to the operational portion of the head suspension 16. The scope of the present invention is not considered to be limited by the specific orientation of the boss 56 and hole 54 relative to the mounting plates location on the actuator head mounting arm 60, as long as the boss 56 on one mounting plate 50 is aligned with the hole 54 on the other.

The bosses 56 and holes 54 of the mounting plates 50 can be seen to be coaxially aligned with the holes 62 in the actuator head mounting arm 60. When the mounting plates 50 are brought together with their respective bosses 56 extending through the holes 62 in the actuator mounting arm 60 and into interference fit with the holes 54 in the opposite mounting plates 50, a fixed mounting relationship is established. This interference fit is the result of an axially exerted force which encourages the mounting plates toward one another, and is much less stressing on the materials of the bosses 56 than is the swaging process previously described.

FIG. 6 also includes an axis identification which will be utilized in subsequent discussions. The X-axis is shown to be co-extensive with the length of the actuator head mounting arm 60 and the lengths of the mounting plate/head suspension assemblies 50/16. The Y-axis is perpendicular to the X-axis and coplanar with the plane of rotation of the actuator head mounting arm 60 about the pivot shaft (22 in FIG. 1) of the actuator. The Z-axis is perpendicular to the plane of rotation of the actuator and the discs (8 in FIG. 1).

The Z-axis retention force of the head suspension mounting system is generated by the interference fit between the bosses 56 on the mounting plates 50 and the holes 54 in the opposite mounting plate 50. The interference fit between the bosses 56 of the mounting plates 50 and the holes 62 in the actuator head mounting arm 60 is relatively small, and serves to provide X- and Y-axis registration of the mounting plate/head suspension assemblies 50/16 to the actuator head mounting arm 60. Resistance of the head suspension mounting system to torque forces which tend to rotate the mounting plate/head suspension assemblies 50/16 about the Z-axis relative to the actuator head mounting arm 60 are countered by the presence of the two bosses 56 spaced along the X-axis of the assembly. Thus the head suspension mounting system of the present invention provides fixed mounting of the head suspensions 16 to the actuator head mounting arm 60 without inducing plastic deformation of any of the system elements.

This lack of plastic deformation of the head suspension mounting system is particularly significant when the prospect of reworking the assembly for replacement of a faulty component is contemplated. If a defective head/head suspension assembly is detected after assembly, the faulty component can be readily pressed out of its engaged condition without risk of damage to other operational system elements. Similarly, a replacement component can be mounted without concern about undesirable reduction of retention force, since none of the system elements are plastically deformed during assembly.

Similarly, the lack of plastic material deformation in the head suspension mounting system of the present invention minimizes changes in the gram load applied by the head suspensions to the heads, and acts to eliminate up/down bias in the gram load.

FIG. 6 also shows a counterbore 76 on the back side of the mounting plate 50 (i.e., the side of the mounting plate 50 away from the actuator head mounting arm 60). This counterbore 76 is coaxial with the central bore 58 in the boss 56, and extends through a portion of the thickness of the planar base portion (52 in FIG. 4) of the mounting plate 50. The counterbore 76 acts as a stress isolator, preventing any stress induced in the boss 56 as a result of its interference fit with the hole 54 in the opposite mounting plate 50 from being transferred to the planar base portion (52 in FIG. 4) of the mounting plate 50.

After examining FIG. 6, a person of skill in the art will realize that, on actuator head mounting arms which overlie the uppermost and lowermost discs in a disc stack, a single head suspension 16 can be mounted on the appropriate side of the actuator head mounting arm 60, with only a mounting plate 50 on the opposite side of the actuator head mounting arm.

Figure 7:
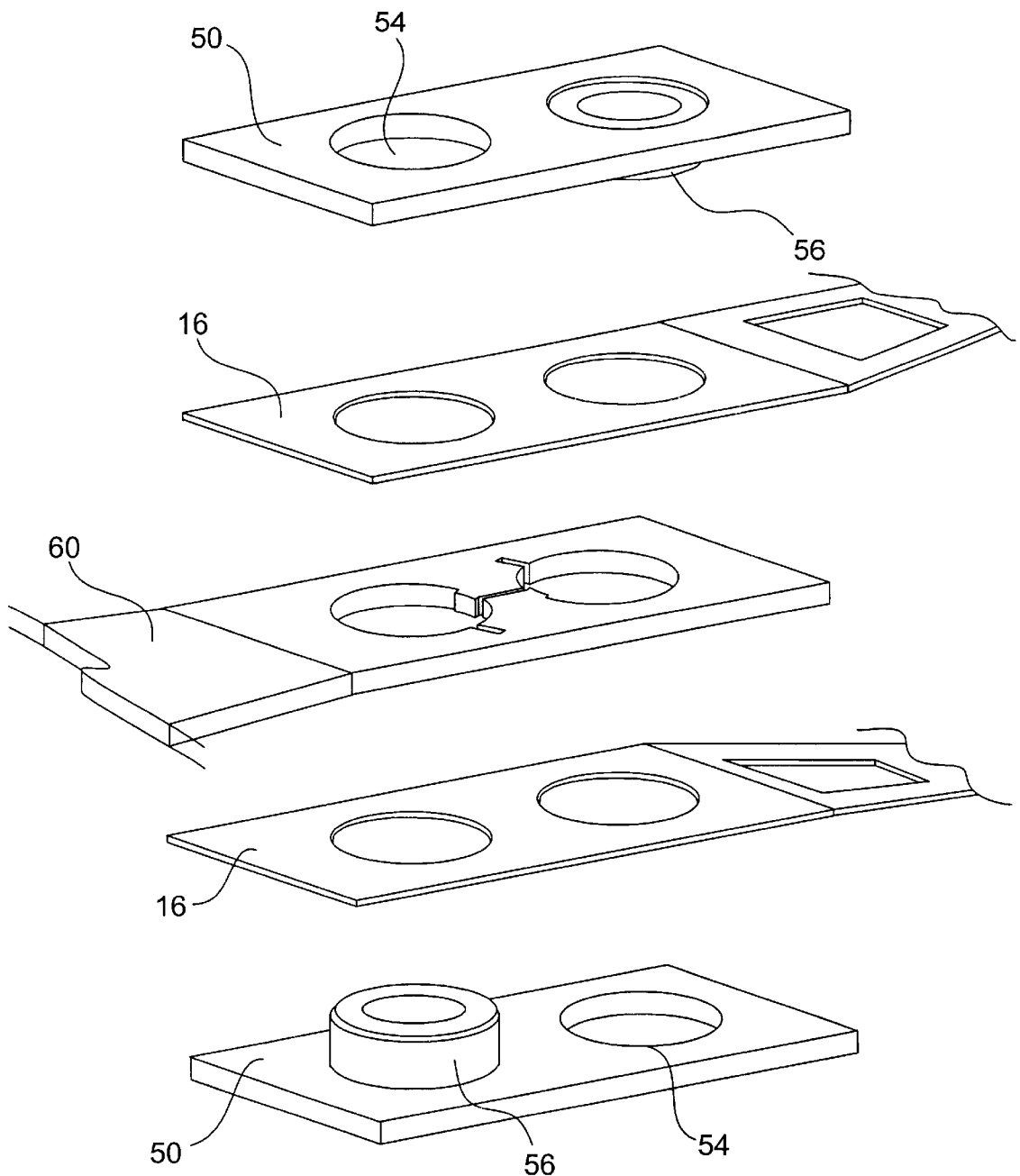
FIG. 7 is an exploded perspective view of components forming a second embodiment of the head suspension mounting system of the present invention.

FIG. 7 is an exploded perspective view of elements making up a second embodiment of the head suspension mounting system of the present invention. FIG. 7 is similar to FIG. 6, except for the fact that the head suspensions 16 are not welded to the mounting plates 50. In the embodiment of FIG. 7, the retention force exerted by the interference fit between the bosses 56 of the mounting plates 50 and the holes 54 in the opposite mounting plates 50 also serves to capture and maintain the head suspensions 16 in their intended relationship to the actuator head mounting arm 60.

By not welding the head suspensions 16 to the mounting plates 50, the manufacturing step of welding is eliminated, as are the effects of localized stress induced in the mounting plates 50 and flexures 16 by the welding process.

Figure 8:
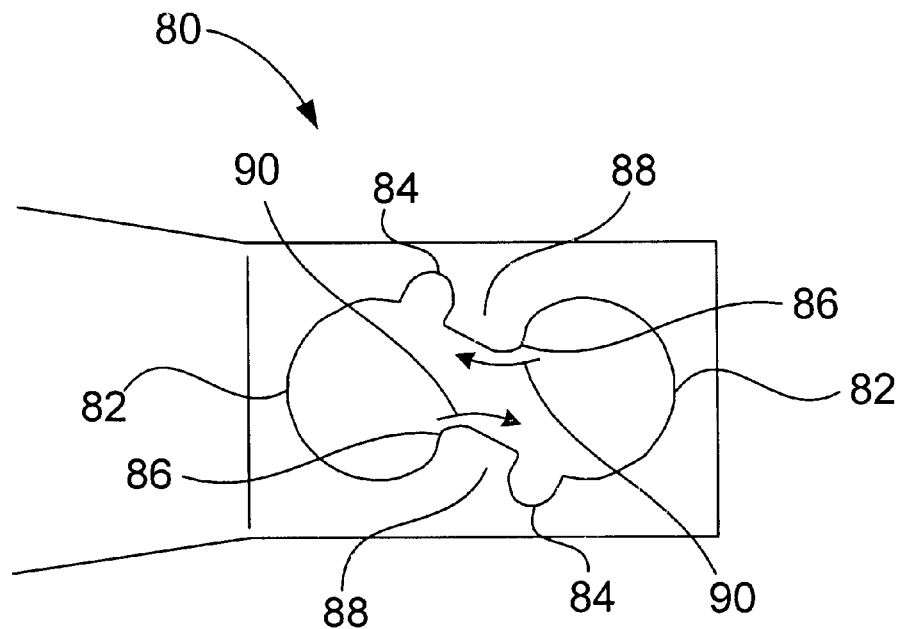
FIG. 8 is a plan view of a second embodiment of an actuator head mounting arm made in accordance with the present invention.

FIG. 8 is a plan view of an alternative, and presently preferred, embodiment of an actuator head mounting arm 80 made in accordance with the present invention.

FIG. 8 shows that the actuator head mounting arm 80 includes two holes 82 intended for interference fit with the bosses of mounting plates, as previously described. The outer diameter of the holes 82 are each interrupted by a rounded notch 84 near the lateral edges of the actuator head mounting arm 80. Each of the holes 82 also includes a contact lobe 86, which extends radially inward from the principal diameter of the holes 82. The material of the actuator head mounting arm 80 lying between the rounded notches 84 and the contact lobes 86 forms a pair of tabs, shown generally at 88.

When the bosses of mounting plates are inserted into the holes 82, contact between the bosses and the contact lobes 86 acts to rotate the tabs 88, generally in the direction of arrows 90. This rotation increases the force of the interference fit in the opposite hole, and also acts to tend to close the rounded notches 84, again minimizing the effects of local stress on the actuator head mounting arm 80.

One of skill in the art will appreciate that the actuator head mounting arm 80 of FIG. 8 lends itself well to the assembly methods discussed above in regard to both FIGS. 6 and 7.

Figure 9:
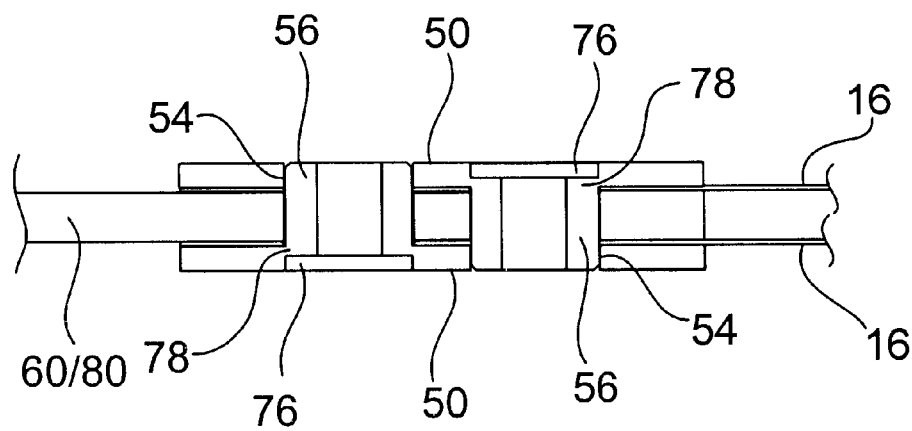
FIG. 9 is a simplified sectional elevation view of the head suspension mounting system of the present invention in its assembled condition.

FIG. 9 is a simplified sectional elevation view of the elements of the head suspension mounting system of the present invention showing the components in their assembled condition. The component relationships shown in FIG. 9 are equally applicable to head suspension mounting systems including the actuator head mounting arm of FIGS. 5 or 8, and to head suspension mounting systems in which the head suspensions are welded to the mounting plates, as in FIG. 6, or not welded to the mounting plates, as in FIG. 7.

In the figure it can be seen that the boss of the upper mounting plate 50 passes through the actuator mounting arm 60/80 and is engaged with the hole 54 in the lower mounting plate 50, and the boss 56 of the lower mounting plate similarly passes through the actuator head mounting arm 60/80 and is engaged with the hole 54 in the upper mounting plate, providing the mounting retention force of the system. The bosses 56 of the mounting plates 50 are also engaged in an interference fit with the holes (62 in FIG. 5, 82 in FIG. 8) in the actuator head mounting arm 60/80, providing proper registration of the mounting plates 50 to the actuator head mounting arm 60/80.

FIG. 9 also shows that the head suspensions 16 are captured between the mounting plates 50 and the actuator head mounting arm 60. This relationship allows for either the welded embodiment of FIG. 6 or the unwelded embodiment of FIG. 7.

Comparing FIG. 9 to the prior art head suspension mounting systems of FIGS. 2 and 3, one apparent advantage of the present invention is that the thickness of the actuator head mounting arm 60/80 can be greatly reduced, since the retention force of the system is exerted between the mounting plates 50, and only a minor interference fit is established between the mounting plates 50 and the holes in the actuator head mounting arm 60/80. This reduction in the thickness of the actuator head mounting arm 60/80 permits the bases of the head suspensions 16 to be brought closer together, which in turn allows either a greater number of heads and discs within a given form factor, or the implementation of smaller form factors.

Reducing the thickness of the actuator head mounting arm also reduces the moving mass of the actuator, enabling faster seeks of the actuator.

FIG. 9 also shows the counterbores 76 at the base of the bosses 56 on the mounting plates 50. As previously mentioned, the counterbores 76 are included in the mounting plates 50 to provide isolation of stresses introduced in the bosses 56 from the planar base portion (52 in FIG. 4). In FIG. 9 it can be seen that the inclusion of the couterbores 76 produces thinned regions, shown generally at 78, at the bases of the bosses 56.

Any material stresses induced in the bosses 56 by their interference fits with the holes 54 in the opposite mounting plate 50 will result in stress concentration in these thinned regions, minimizing the transfer of stresses within the bosses 56 to other portions of the mounting plates 50.

One of skill in the art will also realize that, since the retention force of the head suspension mounting system of the present invention is developed solely between the mounting plate features and not between the mounting plates 50 and the actuator head mounting arm 60/80, there is no plastic deformation of the system elements which could lead to up/down bias in the gram load of the suspensions.

From the foregoing, it is apparent that the present invention is particularly well suited and well adapted to achieve the objects set forth hereinabove, as well as possessing other advantages inherent therein. While particular configurations of the present invention have been disclosed as example embodiments, certain variations and modifications which fall within the envisioned scope of the invention may be suggested to one of skill in the art upon reading this disclosure. Therefore, the scope of the present invention should be considered to be limited only by the following claims.

What is claimed is:

1. A flexure mounting apparatus, comprising:
   an arm having a first aperture at a distal end thereof, the first aperture being defined at least in part by a compliant portion of the arm;
   a first fastening element mounted on a first side of the arm, the first fastening element comprising a first connector corresponding in location to the first arm aperture; and a second fastening element mounted on a second side of the arm opposite the first side, the second fastening element having a second connector corresponding in location to the first arm aperture, in which one of the first and second connectors is a first connector boss and the other of the first and second connectors is a first connector aperture, the first connector boss being of a size to extend through the first arm aperture and to interfere with both the first arm aperture and the first connector aperture.

2. The apparatus of claim 1, in which the first connector comprises the connector boss.

3. The apparatus of claim 1, in which the first fastening element comprises a first plate, the first connector being mounted to the first plate.

4. The apparatus of claim 3, in which the second fastening element comprises a second plate, the second connector being mounted to the second plate.

5. The apparatus of claim 1, in which the first and second fastening elements are identical.

6. The apparatus of claim 1, in which the first fastening element further comprises a third connector, and in which the second fastening element further comprises a fourth connector, the apparatus further comprising:

a second aperture in the arm, and in which one of the third and fourth connectors is a second connector boss and the other of the third and fourth connectors is a second connector aperture, the second connector boss being of a size to extend through the second arm aperture and to interfere with both the second arm aperture and the second connector aperture.

7. The apparatus of claim 6, in which the first connector comprises the first connector boss and the third connector comprises the second connector aperture.

8. The apparatus of claim 1, in which the compliant portion of the arm comprises a slot communicating with the first arm aperture.

9. The apparatus of claim 6, in which the compliant portion of the arm comprises a slot communicating with the first and second arm apertures.

10. The flexure mounting apparatus of claim 8, in which each of the first and second holes are defined at least in part by a compliant portion of the arm, the compliant portions aiding in increasing a force with which the interference fit between the arm apertures and the connectors is established.

11. A flexure mounting apparatus, comprising:

an arm having a first and second apertures at a distal end thereof;

a first fastening element comprising a first connector corresponding in location to the first arm aperture and a second connector corresponding in location to the second arm aperture; and a second fastening element mounted on a second side of the arm opposite the first side, the fastening element having a third connector corresponding in location to the first arm aperture and a fourth connector corresponding in location to the second arm aperture, in which one of the first and third connectors is configured to extend into and establish an interference fit with the first arm aperture and to connect to the other of the first and third connectors, and in which one of the second and fourth connectors is configured to extend into and establish an interference fit with the second arm aperture and to connect to the other of the second and fourth connectors, and further in which connecting the first and third connectors increases a force with which the interference fit in the second arm aperture is established.

12. The flexure mounting apparatus of claim 11, in which the first connector comprises a boss and the third connector comprises an aperture.

13. The flexure mounting apparatus of claim 12, in which the second connector comprises an aperture and the fourth connector comprises a boss.

14. The flexure mounting apparatus of claim 11, in which the first fastening element comprises a first plate to which the first and second connectors are mounted.

15. The flexure mounting apparatus of claim 14, in which the second fastening element comprises a second plate to which the third and fourth connectors are mounted.

* * * * *